United States Patent [19]
Deygas et al.

[11] Patent Number: 6,144,321
[45] Date of Patent: *Nov. 7, 2000

[54] MICROPROCESSOR DEDICATED TO PROCESSING OF BIT STREAMS IN A SYSTEM OF COMPRESSION/ DECOMPRESSION OF ANIMATED IMAGES

[75] Inventors: Olivier Deygas, Saint Martin h'Heres; Michel Harrand, Saint Egreve, both of France

[73] Assignee: SGS-Thomson Microelectronics S.A., Gentilly, France

[*] Notice: This patent issued on a continued prosecution application filed under 37 CFR 1.53(d), and is subject to the twenty year patent term provisions of 35 U.S.C. 154(a)(2).

[21] Appl. No.: 08/990,925

[22] Filed: Dec. 15, 1997

[30] Foreign Application Priority Data

Dec. 17, 1996 [FR] France .................................. 96 15912

[51] Int. Cl.$^7$ ...................................................... H03M 7/40

[52] U.S. Cl. .............................................. 341/67; 341/65

[58] Field of Search ................................. 341/65, 67, 50, 341/63; 395/59, 613

[56] References Cited

U.S. PATENT DOCUMENTS 5,832,037 11/1998 Park .......................................... 375/240
6,054,942 4/2000 Stemmler .................................. 341/58

OTHER PUBLICATIONS

Copending U.S. Patent Application Serial No. 08/991,022, filed Dec. 15, 1997 entitled: "Microprocessor Dedicated To Processing Of Bit Streams Of Compression/Decompression Of Animated Images".

1993 IEEE International Solid–State Circuits Conference, Digest of Technical Papers, ISSCC, First Edition (Cat. No. 93CH3272–2), Proceedings of IEEE International Solid–State Circuits Conference—ISSCC '93, San Francisco, CA, USA, Feb. 24–26, 1993, New York, NY, USA, IEEE, USA, pp 32–33, Rao, S.K., et al. "A Real Time P*64/MPEG Video Encoder Chip".

1995 IEEE International Solid–State Circuits Conference, Digest of Technical Papers, ISSCC (Cat. No. 95CH35753), Proceedings ISSCC '95—International Solid State Circuits Conference, Sand Francisco, CA USA, Feb. 15–17, 1995, New York, NY, USA, IEEE, USA, pp 292–293, Harrand M., et al. "A Single Chip Videophone Video Encoder/Decoder".

Proceedings of the Fourth International Conference on Signal Processing Applications and Technology, Proceedings of the Fourth International Conference on Signal Processing Applications and Technology, ICSPAT '93, Santa Clara, CA, USA, Sep. 28–Oct., 1, 1993, Newton, MA, USA, DSP Associates, USA pp 22–31 vol. 1, Rasse Y., "An H.261 Single–Chip Low Bit Rate Video–Codec".

(List continued on next page.)

Primary Examiner—Peguy Jean Pierre
Attorney, Agent, or Firm—Wolf, Greenfield & Sacks, P.C.; James H. Morris; Theodore E. Galanthay

[57] ABSTRACT

The present invention relates to a microprocessor including an operator dedicated to a concatenation of variable-length codes to form a sequence of contiguous codes, the operator being associated with a dedicated instruction using two parameters, a first one of which is a word containing a group of bits and the second one of which indicates the length of the group of bits, the operator responding to the dedicated instruction by isolating, in the first parameter, the group of bits having the length indicated by the second parameter and by inserting the bit group so isolated into an active register, in concatenation with a bit group which has been inserted in the active register by a previous execution of the dedicated instruction.

31 Claims, 4 Drawing Sheets

OTHER PUBLICATIONS

Proceedings of the Region 10 Conference on Computer and Communication Systems (Tencon), Hong Kong, Sep., 24–27, 1990, vol. 2 of 2, Sep. 24, 1990, Institute of Electrical and Electronics Engineers, pp 551–554, Kun–Min Yang, et al., "VLSI Architecture Design of a Versatile Variable Length Deconding Chip for Real–Time Video Codecs".

IEEE: International Solid—State Circuits Conference, Feb. 24, 1993, pp. 34–35, Brinthaupt D., et al, "A Video Decoder For H.261 Video Teleconferencing And MPEG Stored Interactive Video Applications".

Symposium On VLSI Circuits, Digest of Technical Papers, Honolulu, Jun. 9–11, 1994, Institute of Electrical and Electronics Engineers, pp 71–72, Eiji Komoto, et al., "A 110MHZ MPEG2 Variable Length Decoder LSI".

Proceedings of the International Conference on Signal Processing Applications and Technology, vol. 2, Oct. 18, 1994, pp 1173–1178, Fairfield, D.J., "A Multi–Standard Video Codec Architecture for the ISA/VL Bus".

NEC Research and Development, vol. 32, No. 4, Oct. 1, 1991, pp 557–568, Endo Y., et al., "Development of CCITT Standard Video Codec: Visualink 5000".

IEEE Transactions on Circuits and Systems for Video Technology, vol. 2, No. 2, Jun. 1, 1992, pp 111–122, Ruetz, P.A., et al., "A High–Performance Full–Motion Video Compression Chip Set".

MICROPROCESSOR DEDICATED TO PROCESSING OF BIT STREAMS IN A SYSTEM OF COMPRESSION/DECOMPRESSION OF ANIMATED IMAGES

BACKGROUND OF THE INVENTION

1. Field of the Invention

The present invention relates to a system of compression/decompression of animated images, especially according to standards H.261 and H.263. The present invention more particularly relates to the subset of such a system used for processing of streams of coded bits transmitted between two systems.

2. Discussion of the Related Art

FIG. 1 schematically shows such a subset 10. This subset includes a variable-length coding (VLC), or Huffman, block 12 providing variable-length codes to a framing block 13. This block 13 issues a series flow of bits meant to be decoded by a reception circuit.

The VLC block generally receives data resulting from a run-level coding (RLC) 14. Such a coding consists in transforming a chain of zeros followed with a non-zero value, the first one of which ("run", or chain) indicates the number of zeros preceding the non-zero value, and the second one of which ("level") provides the non-zero value.

A reception circuit, also included in subset 10, includes a frame processing (unframing) block 15 followed with a variable-length decoding (VLD) block 16 to perform the operations reciprocal to framing 13 and VLC 12.

VLD 16 is generally followed with a run-level decoding (RLD) 17, reciprocal to the RLC.

A VLC or Huffman coding consists of replacing each run-level couple with a code, the length of which (from 2 to 12 bits for standards H.261 and H.263) is all the shorter as the probability of occurrence of the couple is large. These variable-length codes are fetched in correspondence tables and concatenated to form a sequence of contiguous codes. The function of framing circuit 14 is to insert the concatenated codes into frames including various informations, especially error correction codes. These frames are defined by standards H.261 and H.263 or by standards H.221 and H.223 which can be used together with standards H.261 and H.263.

The operations of subset 10 are generally performed in a wired manner. Indeed, if a microprocessor of general use programmed to perform these operations was desired to be used, the processing power would be too much for the cost of the microprocessor to be reasonable. This remains true in the context of standard H.263 where the bit streams have a particularly low rate (adapted to the telephone lines of the switched network).

Yet, the use of a microprocessor to perform the operations of subset 10 would be especially advantageous since it would enable a particularly easy adaptation to variations of the standards by a simple program modification without having to entirely redesign the subset.

SUMMARY OF THE INVENTION

An object of the present invention is to enable the implementation of functions of the bit stream processing subset by means of a microprocessor of particularly low power.

To achieve this and other objects, the present invention provides to use a microprocessor of general use including wired operators dedicated to specific operations found in the processing of bit streams according to standards H.261, H.263, H.221, or H.223. These dedicated operators are operated by specific instructions which are added to a conventional set of instructions. By properly choosing the functions of the dedicated operators, the power of the microprocessor can be made so low that the cost of the resulting subset becomes even lower than that of a purely wired subset.

According to an embodiment of the present invention, the operations for which a dedicated operator is provided are the concatenation of the variable-length codes to supply a sequence of contiguous codes, the extraction of the variable-length codes of such a sequence, and the calculation of a signature over a bit sequence. Preferably, the microprocessor will include an operator that performs all three operations, but it should be noted that the use of an operator performing a single one of these three operations provides significant processing power gains.

Thus, a first version of a microprocessor according to the present invention includes an operator dedicated to a concatenation of variable-length codes to form a sequence of contiguous codes, the operator being associated with a dedicated instruction using two parameters, a first one of which is a word containing a group of bits and the second one of which indicates the length of the group of bits, the operator responding to the dedicated instruction by isolating in the first parameter the group of bits having the length indicated by the second parameter and by inserting the bit group so isolated into an active register, in concatenation with a bit group which has been inserted in the active register by a previous execution of the dedicated instruction.

According to an embodiment of the present invention, the operator includes a reference register updated upon each execution of the dedicated instruction to indicate the position from which the bit group is to be inserted in the active register.

According to an embodiment of the present invention, when the second parameter and the reference register indicate that available space in the active register is insufficient for receiving the it group, the operator responds to the dedicated instruction by transferring the content of the active register into an auxiliary register of the same size and completing the auxiliary register with the first bits of the group; by inserting the remaining bits of the group at the beginning of the active register; and by updating the reference register to indicate the position immediately following the remaining bits in the active register.

According to an embodiment of the present invention, the reference register indicates the available space in the active register, and the operator includes means for updating the reference register with the difference between its content and the second parameter if the sign of this difference is positive, and with the sum of the difference and of the size of the active register if the sign is negative.

A second version of a microprocessor according to the present invention includes an operator dedicated to an extraction of variable-length codes from a sequence of contiguous codes, the operator being associated with a dedicated instruction using a parameter which indicates the length of a group of bits to be extracted, the operator responding to the instruction by extracting from an active register the number of bits indicated by the parameter, starting from the end of a group of bits which has been extracted from the active register by a preceding execution of the dedicated instruction.

According to an embodiment of the present invention, the operator includes a reference register updated for each execution of the dedicated instruction to indicate the position from which the group of bits is to be extracted from the active register.

According to an embodiment of the present invention, when the parameter and the reference register indicate that the last bits to be extracted from the active register are in insufficient number to form the group, the operator responds to the dedicated instruction by extracting the last bits of the active register and the missing bits to complete the group at the end of an auxiliary register of same size as the active register; by transferring the content of the auxiliary register into the active register; and by updating the reference register to indicate the position immediately following the missing bits in the active register.

According to an embodiment of the present invention, the reference register indicates the number of remaining bits to be extracted from the active register, and the operator includes means for updating the reference register with the difference between its content and the parameter if the sign of the difference is positive, and with the sum of the difference and of the size of the active register if the sign is negative.

A third version of a microprocessor according to the present invention includes an operator dedicated to the concatenation as well as to the extraction of variable-length codes.

A fourth version of a microprocessor according to the present invention includes an operator dedicated to a signature calculation over a bit sequence, the operator being associated with a dedicated instruction using two parameters, a first one of which is a word including a group of bits forming a successive portion of the sequence, and the second parameter of which indicates the length of the group of bits, the operator responding to the dedicated instruction by updating a signature register with a signature calculated over the content of the signature register and over the group of bits.

According to an embodiment of the present invention, the signature is the remainder of a polynomial division of the sequence of bits by a generator polynomial contained in a polynomial register.

According to an embodiment of the present invention, the dedicated operator includes exclusive-OR gates disposed in w rows and n columns, n being the size of the signature register and w the maximum length of the group of bits, the i-th gate of the j-th row receiving the i-th bit of the polynomial register on a first input and, on a second input, the (i+1)-th bit of the signature register if j=1, the j-th bit of the first parameter if i=n, and the output of the (i+1)-th gate of the preceding row otherwise; and means for selecting the row, the rank of which corresponds to the second parameter and transferring into the signature register the outputs of the gates of the selected row.

According to an embodiment of the present invention, these means include, for the i-th gate of the j-th row, a multiplexer receiving the output of the gate on a first input and, on a second input, the i-th bit of the signature register if j=1 and the output of the i-th multiplexer of the (j−1)-th row otherwise, the new content of the signature register being issued by the outputs of the multiplexers of the last row; and a decoder receiving the second parameter to switch the multiplexers of a corresponding number of first rows to their first input and switch the multiplexers of the remaining rows to their second input.

A fifth version of a microprocessor according to the present invention includes an operator dedicated to a concatenation of variable-length codes, to an extraction of variable-length codes, as well as to a signature calculation over a bit sequence.

The foregoing objects, characteristics and advantages of the present invention will be discussed in detail in the following non-limiting description of specific embodiments made in connection with the accompanying drawings.

DETAILED DESCRIPTION

According to the present invention, it is provided to implement, in software form, the processing of bit streams of a system of compression/decompression of moving images. The present invention is based on a study performed by the applicant which has revealed the operations which would be the costliest in terms of processing time if they had to be performed by a general purpose microprocessor. These operations are the concatenation of variable-length codes to provide a sequence of contiguous codes, the extraction of variable-length codes from a sequence of contiguous codes, and the calculation of a signature over a sequence of bits. By providing a conventional microprocessor of general use completed with a wired operator performing at least one of these operations upon execution of a dedicated instruction, the power of the microprocessor is significantly reduced. For example, to meet standard H.223 (maximum rate of 500 kbits/s), a wired operator dedicated to the three above-mentioned operations enables to use of an 8-bit microprocessor clocked at a frequency of 54 MHz. The frequency of the microprocessor decreases to 3 MHz in the specific context of standard H.263 (maximum rate of 30 kbits/s).

Before describing in more detail the present invention, a conventional microprocessor architecture in which the additional wired operator according to the present invention can be incorporated is described.

Figure 1:
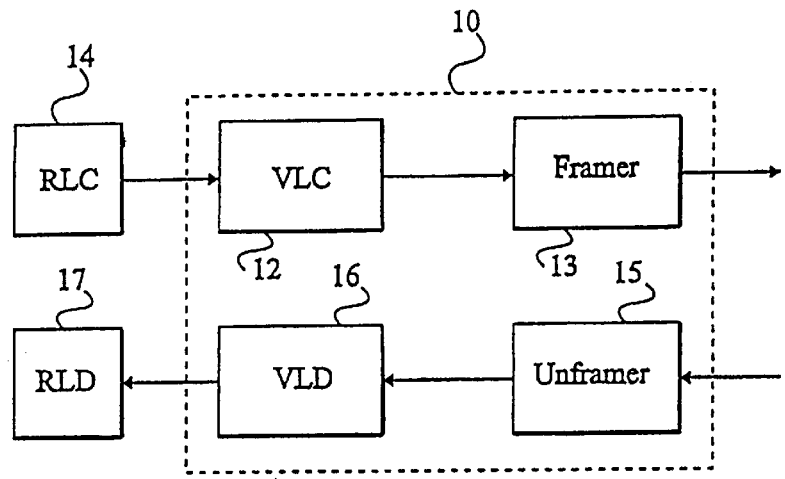
FIG. 1, previously described, illustrates conventional operations performed in the processing of bit streams in a system of compression/decompression of moving images.
Figure 2:
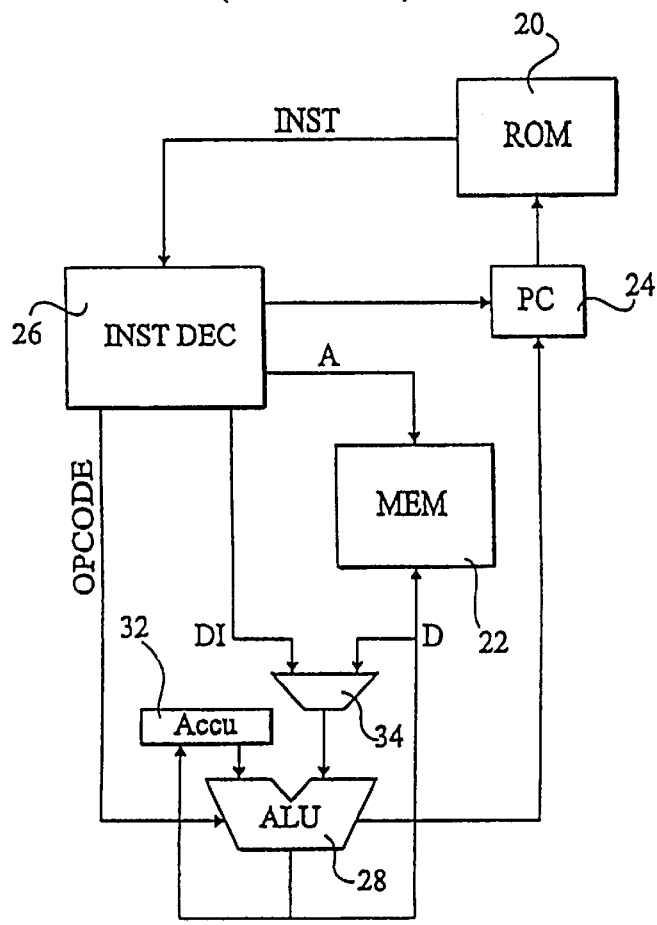
FIG. 2 shows a conventional architecture of microprocessor which can be used as a basis to implement a dedicated microprocessor according to the present invention.

FIG. 2 schematically illustrates a conventional microprocessor of "Harvard" type. This microprocessor includes a ROM 20 containing the instructions of the program to be executed, this ROM being separated from a memory (ROM or RAM) 22 in which data necessary for the program are stored. A program counter (PC) 24 selects from memory 20 the instruction to be executed, this instruction being supplied to an instruction decoder 26. Decoder 26 issues an operation code (opcode) which operates one or several corresponding wired operators in an arithmetic and logic unit (ALU) 28. Various other usual active registers, especially an accumulator 32, are associated with the ALU.

According to the instruction, decoder 26 issues a jump address to program counter 24, a read or write address A to memory 22, or an immediate datum DI to unit 28. Memory 22, ALU 28, and accumulator 32 are interconnected by a data bus D. A multiplexer 34 enables to select, among immediate datum DI and a datum present on bus D, that which is supplied to ALU 28. This selection is performed by a bit of the opcode.

ALU 28 includes various flags which are raised according to the results of certain operations. In the case of the execution of a conditional jump, a flag corresponding to the condition is provided to program counter 24. According to the state of this flag, the address issued by decoder 26 is loaded or not into program counter 24.

To obtain additional details concerning operation of a microprocessor of the type in FIG. 2, one can refer to many works on microprocessors. The architecture of FIG. 2 is given as an example and those skilled in the art will understand that the present invention can also apply to other types of microprocessors.

A microprocessor according to the present invention integrates in its arithmetical and logic unit 28, in addition to the wired operators enabling performance of the conventional operations of a general use microprocessor (addition, multiplication, logic operations, etc.), a wired operator enabling performance of at least one of the three above-mentioned operations, which are specific to bit stream processing in an image compression/decompression system.

Figure 3A:
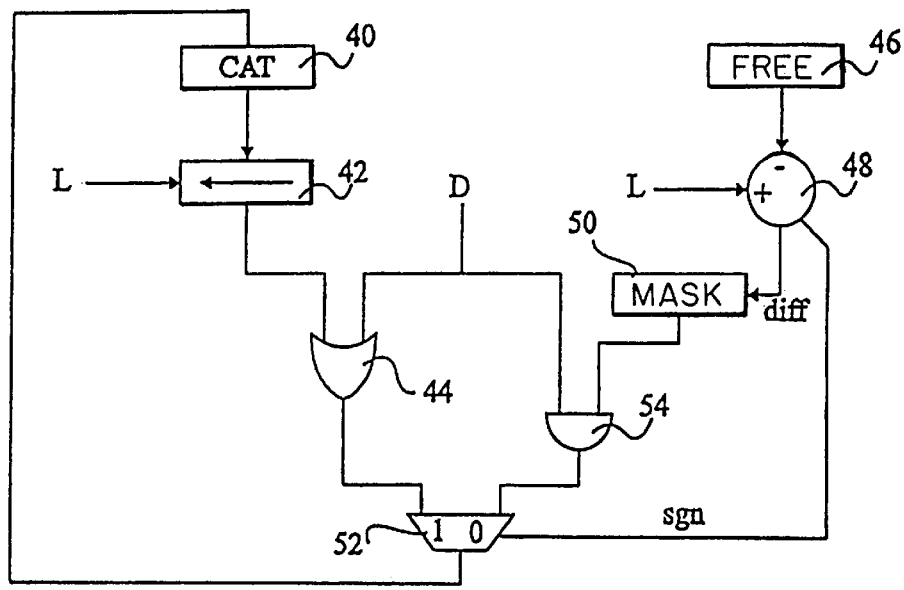
FIGS. 3A to 3C show an example of wired operator completing the microprocessor of FIG. 2 to perform a concatenation of variable-length codes.
Figure 3B:
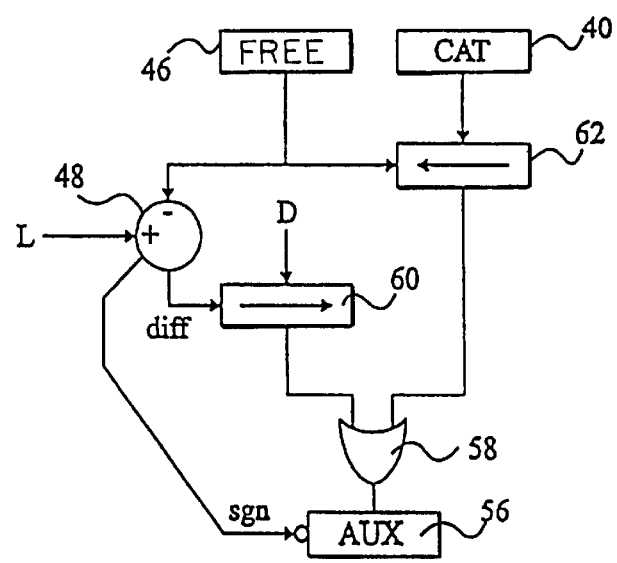
Figure 3C:
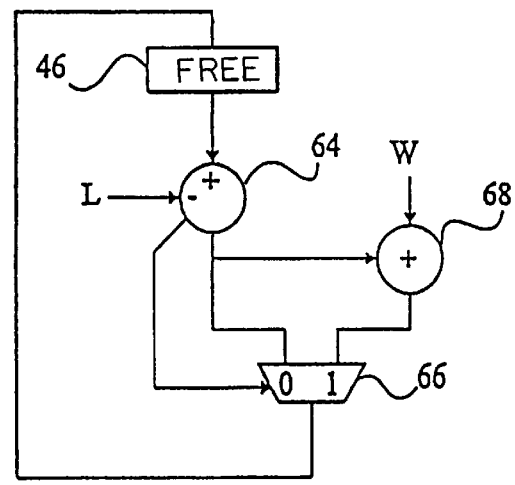

FIGS. 3A to 3C show three portions of an example of wired operator for performing the concatenation of variable-length or Huffman codes. This operator responds to a specific concatenation instruction which will be referred to as "CAT" and which is used with two parameters. A first parameter D is a word containing a Huffman code to be concatenated, and the second parameter is a word indicating the length L of the code contained in the first parameter. The width of these words will generally be that of data bus D (for example 8 bits). The Huffman code, the length of which is not equal to the width of the bus, is for example stored on the right side of the word containing it.

The passing of these two parameters is performed according to conventional mechanisms. For example, instruction CAT can be used with an address indicating the location in memory 22 of the word containing the Huffman code to be processed. Decoder 26 then presents this address to memory 22 and issues an opcode which operates an operator for reading from the memory in ALU 28. This opcode operates at the same time the operator dedicated to the concatenation which exploits, as a first parameter, the word present on data bus D and, as a second parameter, a word contained in accumulator 32, for example. The programmer has to provide for loading of the length L of the code by any conventional means into accumulator 32 just before the execution of instruction CAT.

The specific function of instruction CAT and of the associated operator is to concatenate L bits of the first parameter D with bits previously inserted in a specific register "CAT". To illustrate this function as an example, it is assumed that the specific register CAT, of 8 bits, contains 0000 1234, where 1234 are bits previously inserted in the register.

If register CAT has enough room to receive the L bits of the code to be concatenated, for example if parameter D is 0000 0ABC, where ABC are the code bits, it is desired to update register CAT with value 0123 4ABC, assuming that the code bits are to be supplied starting with the most significant bits.

If register CAT does not contain enough room to receive the code, for example if parameter D is 00AB CDEF, it is desired to update register CAT with value 0000 00EF and to transfer in an auxiliary register AUX value 1234 ABCD. Each time the auxiliary register is so updated, it contains a successive sequence of bits pertaining to contiguous or concatenated codes.

In FIG. 3A, the specific register CAT is designated by reference 40. The content of register CAT is supplied to a circuit for shifting to the left by the number of bits indicated by parameter L. A bit-to-bit OR gate 44 receives the output of shift circuit 42 and the word D containing the Huffman code to be concatenated.

A register (FREE) 46 indicates the available space in register CAT for receiving a new code. A subtractor 48 calculates the difference between parameter L and the content of register 46. This difference is issued to a mask generator 50 and the sign sgn of the difference controls a multiplexer 52. If the sign is negative, indicating that the spare room in register CAT is sufficient to receive the code to be concatenated, multiplexer 52 chooses the output of gate 44 to update the content of register CAT. If the sign is positive, that is, if register CAT does not contain enough room to receive the code to be concatenated, multiplexer 52 chooses the output of a bit-to-bit AND gate 54 to update the content of register CAT. AND gate 54 receives the word D containing the code to be concatenated and the mask created by the mask generator 50. All the bits of the mask are at zero, except for a number of least significant bits equal to the difference issued by subtractor 48.

Referring again to the first above-mentioned example, register CAT contains value 0000 1234, word D is 0000 0ABC, parameter L is 3, and register 46, indicating the spare room in register CAT, contains value 4. Left-shift circuit 42 issues value 0123 4000 which, combined by OR-gate 44 with word D, effectively supplies value 0123 4ABC. Multiplexer 52 selects this value to update register CAT since the difference between parameter L and the content of register 46 is negative.

Referring again to the second above-mentioned example, word D is 00AB CDEF, parameter L is 6, and the spare room, contained in register 46, is 4. Multiplexer 52 then selects the output of AND gate 54. Since mask 50 is 0000 0011, the value with which register CAT is updated is 0000 00EF. Thus, the last bits of the code are inserted at the beginning of register CAT.

In FIG. 3B, above-mentioned auxiliary register AUX, in which the preceding content of register CAT, completed with the first bits of the code is transferred, is designated by reference 56. Register AUX receives the output of a bit-to-bit OR gate 58. A first input of this gate 58 receives the output of a circuit 60 for shifting word D to the right. The amount of shifting of this circuit 60 is determined by the difference supplied by subtractor 48.

A second input of OR gate 58 receives the output of a circuit 62 for shifting to the left the content of register CAT. The amount of shifting of this circuit 62 is determined by the content of register 46. Auxiliary register 56 loads the output of gate 58 when the sign of the difference supplied by subtractor 48 is positive.

In the above-mentioned example where word D is 00AB CDEF, the output of shift circuit 62 is 1234 0000, while the output of shift circuit 60 is 0000 ABCD. The output of gate 58 then effectively supplies the expected value 1234 ABCD to auxiliary register 56.

FIG. 3C illustrates an example of a circuit that enables updating register 46 so that it indicates the available space in register CAT upon each concatenation (upon each execution of instruction CAT). A subtractor 64 issues to a first input of a multiplexer 66 the difference between the content of register 46 and parameter L. This difference is also issued to an adder 68 which further receives a fixed value w equal to the size of register CAT (8 in the examples). The output of this adder 68 is provided to the second input of multiplexer 66. Multiplexer 66 selects, to update the content of register 46, the output of subtractor 64 if the sign of the difference that it supplies is positive, and selects the output of adder 68 if the sign is negative.

The way in which instruction CAT is used and combined with conventional instructions is left free to the programmer and is not necessary to the operation of the present invention. The programmer must only provide that the content of auxiliary register 56 is read each time it has been renewed. This can be performed in different ways, for example by comparing the current content of register CAT with the content that it had upon the preceding execution of instruction CAT, or by keeping a record of the successive lengths L.

The successive contents of auxiliary register 56 are for example stored at consecutive addresses of memory 22 to form a succession of contiguous codings.

In the context of a variable-length coding, the correspondence between each couple of run-level values and a Huffman code is supplied by standardized tables stored in a ROM pertaining to memory 22. The operations of search of a Huffman code in the tables can be performed efficiently enough by a series of general use instructions. Once the search is ended, the code found and its length are stored at predefined addresses. Then, for example, the length is written into accumulator 32 by a conventional instruction and instruction CAT is executed immediately after with the address of the found code.

The succession of contiguous codes generated based on the successive contents of auxiliary register 56 is submitted to framing operations according to standards H.221 or H.223. Part of the framing operations are preferably performed by means of a dedicated operator described hereafter.

The length of a code may sometimes be greater than the width of the data bus and of register CAT. In this case, the code is fractionated and the code fractions are processed by successive instructions CAT.

Figure 4:
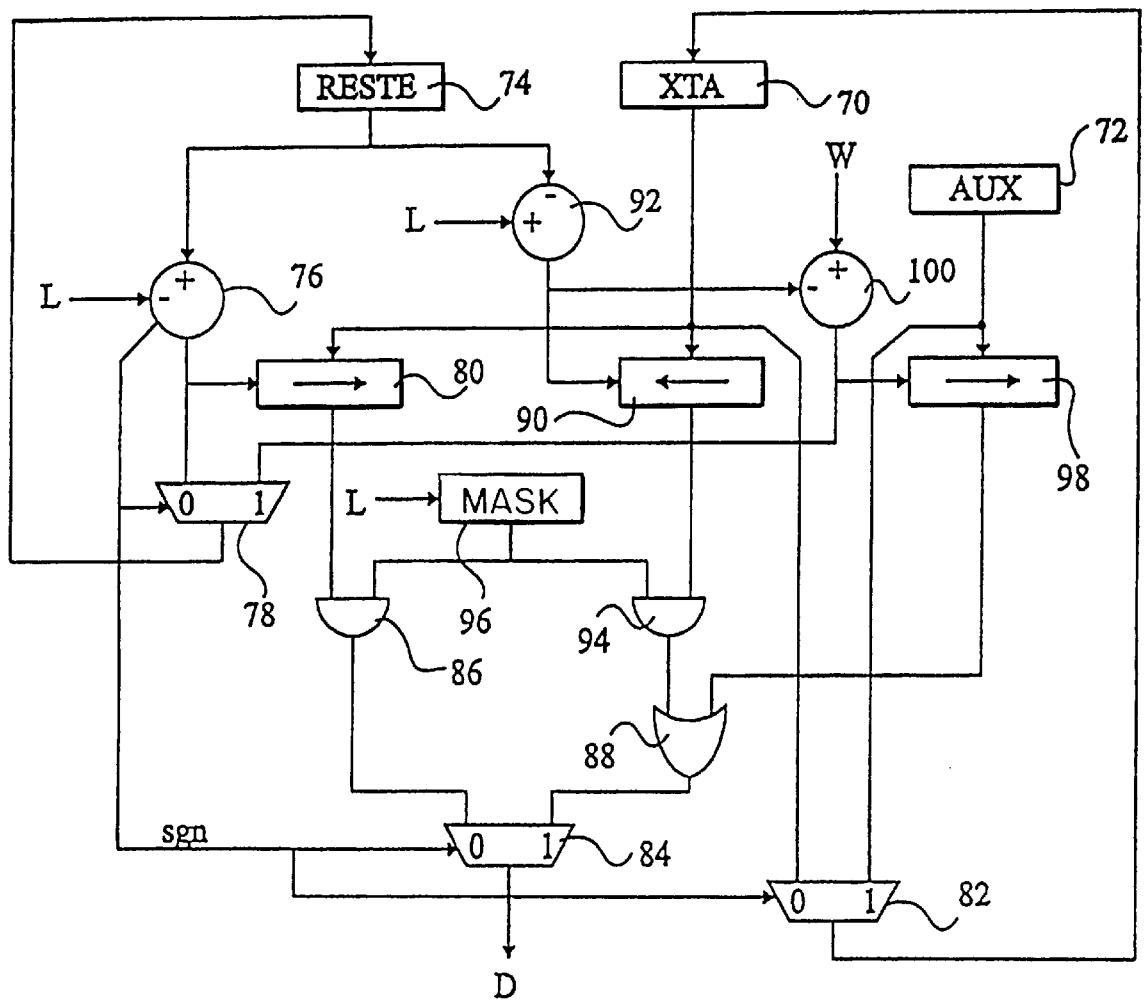
FIG. 4 shows an example of a wired operator enabling performance of variable-length code extraction.

FIG. 4 schematically shows an example of a wired operator dedicated to the extraction of Huffman codes from a sequence of contiguous or concatenated codes. This operator responds to a specific instruction which will be referred to "XTA" and which is used with, as a parameter, the length L of a code to be extracted. Instruction XTA is actually reciprocal to instruction CAT.

The specific function of instruction XTA and of the associated operator is to extract L consecutive bits from a specific register XTA 70 immediately after the previously extracted bits. Register XTA stores a successive portion of a sequence of codes being processed.

If the number of bits to be extracted is higher than the number of bits effectively remaining to be extracted from register XTA, the missing bits are taken at the beginning of an auxiliary register AUX. The number of bits remaining to be extracted from register XTA is indicated by a register (RESTE) 74.

A subtractor 76 provides the difference between the length L provided by instruction XTA and the content RESTE of register 74 to a first input of a multiplexer 78 and to a control input of a right-shift circuit 80. A multiplexer 82 updates the content of register XTA with itself when the sign sgn of the difference is positive, and with the content of auxiliary register 72 when this sign is negative. Sign sgn also controls a multiplexer 84 which receives on a first input the output of a bit-to-bit AND gate 86 and on a second input the output of a bit-to-bit OR gate 88. The output of multiplexer 84 provides a word D containing the extracted bits, stored on the right side. If sign sgn is positive, multiplexer 84 selects the output of gate 86 for word D, otherwise it selects the output of gate 88.

Word D is provided, for example, on the data bus. In this case, instruction XTA is used with an additional parameter which is the address at which word D is to be written. According to an alternative, word D can be written into a register, for example accumulator 32, where it will be read by a further instruction.

The content of register XTA is provided to the input of right-shift circuit 80 and to the input of a left-shift circuit 90. A subtractor 92 provides as a command to shift circuit 90 the difference between length L and the content RESTE of register 74. The outputs of shift circuits 80 and 90 are respectively provided to the first inputs of gate 86 and of a bit-to-bit AND gate 94. The second inputs of gates 86 and 94 receive the output of a mask generator 96 controlled by length L.

OR gate 88 receives on a first input the output of gate 94 and, on a second input, the output of a right-shift circuit 98. This shift circuit 98 receives the content of auxiliary register 72 and is controlled by a subtractor 100 which supplies the difference between a fixed value w, corresponding to the size of register XTA, and the value provided by subtractor 92.

The difference provided by subtractor 100 is also provided to a second input of multiplexer 78 which updates the content RESTE of register 74 with the difference provided by subtractor 76 when this difference is positive, and with the difference provided by subtractor 100 otherwise.

As an example, it is assumed that register XTA contains value XXAB CDXX, where ABCD are four bits to be extracted. Thus, L=4 and RESTE=6. Circuit 80 shifts to the right the content of register XTA by 2, and thus provides value 00XX ABCD. The mask provided by circuit 96 is 00001111. The output of AND gate 86, transmitted as a word D by multiplexer 84, supplies the desired value 0000 ABCD.

The content RESTE of register 74 is updated with value 2 provided by subtractor 76. The content of register XTA remains unchanged, but register 74 indicates that there only remain 2 bits to be extracted from register XTA upon the next execution of instruction XTA.

In the following example, the code to be extracted is too long with respect to the bits remaining to be extracted from register XTA. It is assumed that the code to be extracted includes 5 bits ABCDE (L=5) and that register XTA contains value XXXX XABC (RESTE =3). The code overlaps the end of register XTA and the beginning of auxiliary register 72 which contains value DEXX XXXX. Circuit 90 shifts the content of register XTA by two bits to the left, and thus issues value XXXA BC00. The mask provided by generator 96 is 0001 1111, whereby AND gate 94 provides value 000A BC00. Circuit 98 shifts the content of auxiliary register 72 by 6 bits to the right, and thus provides value 0000 00DE. The output of OR gate 88, which is selected by multiplexer 84, provides the desired value 000A BCDE for word D.

Register XTA is updated with the content of auxiliary register 72, while register 74 is updated with value 6 provided by subtractor 100. Thus, register XTA receives value DEXX XXXX, while register 74 indicates that there remains 6 bits to be extracted from register XTA upon the next execution of instruction XTA, that is, the 6"X" bits.

The way in which instruction XTA is used and combined with conventional instructions is left free to the programmer and is not necessary to the operation of the present invention. The programmer must only provide that the content of auxiliary register 72 is renewed each time that it has been transferred into register XTA. This can be performed in different ways, for example by comparing the current content of register XTA with the content that it had upon the previous execution of instruction XTA, or by keeping a record of the successive lengths L.

In the context of a variable-length decoding, the sequence of bits to be processed is, for example, stored in the memory by words at consecutive addresses. At the beginning of the processing of the sequence, the two first words of the sequence are respectively written into register XTA and auxiliary register 72, while register 74 is set to value 8 (the size of register XTA). The following words of the sequence will be successively written into auxiliary register 72 as the content of register XTA is renewed by the automatic transfers of the successive contents of auxiliary register 72.

The length L of a code to be extracted is not known in advance. Thus, before extracting a code, its length L has to be found, which is performed by examining the beginning of the code bit per bit. Indeed, the first bits of a Huffman code determine the length of the code with reference to the Huffman tables stored in memory 22. More specifically, the Huffman tables are hierarchically organized in sub-tables, and each successive bit of the code identifies a sub-table of lower hierarchic level than the sub-table identified by the preceding bit. When an undetermined number of first bits has been examined, a specific sub-table is identified, which only contains codes of same length. The code length is known at that moment. The translation of the code is to be found in this table and is identified by the still unexamined bits of the code.

The one-by-one extraction of the first bits of each code can advantageously be performed by successive executions of instruction XTA with L=1. Once the code length has been found, instruction XTA is executed with parameter L being equal to the code length, diminished by the number of first bits examined. This operation extracts the still unexamined bits of the code which enable finding the translation of the code in the sub-table which has been identified by the first bits.

Figure 5:
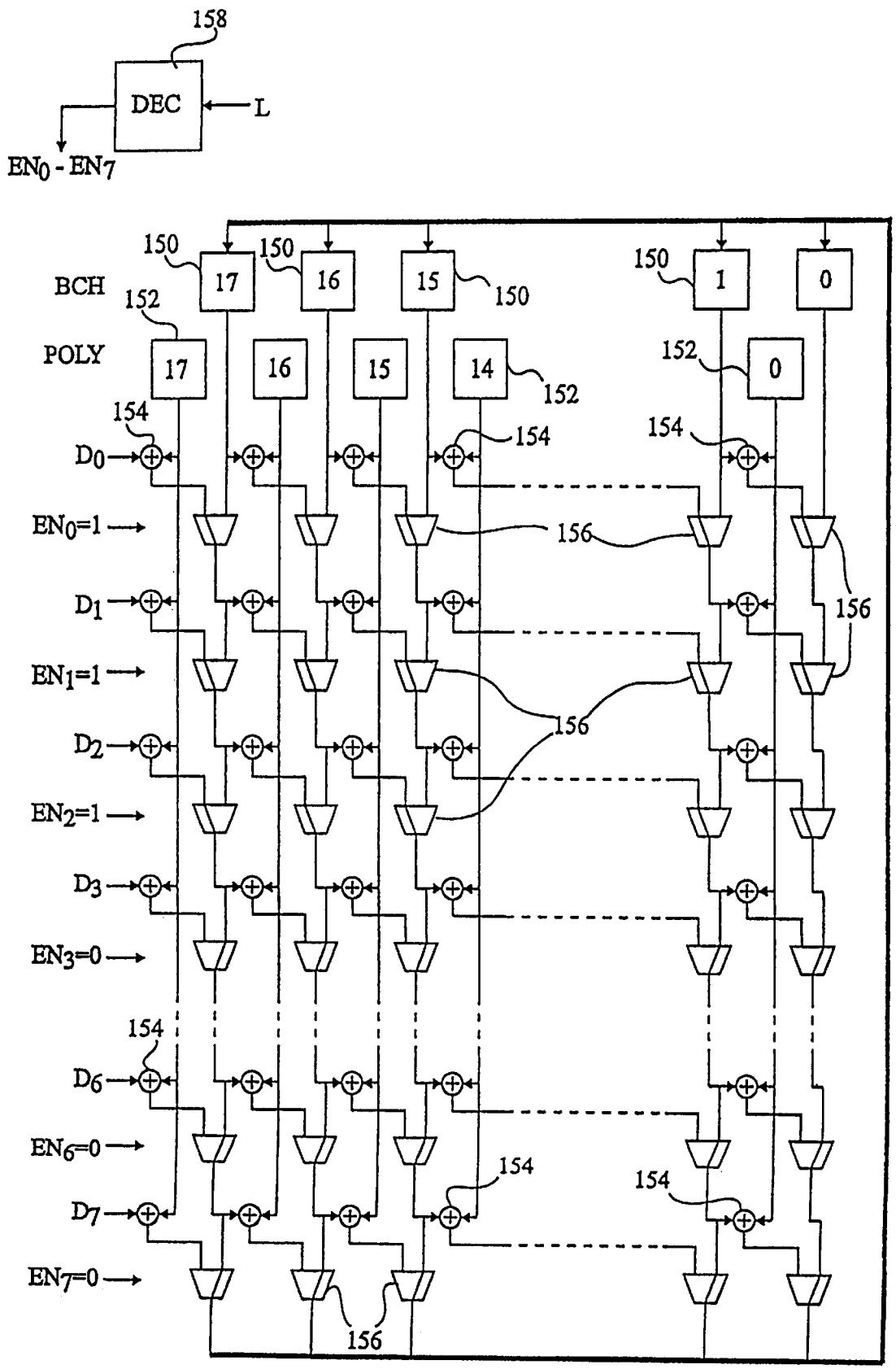
FIG. 5 shows an example of a wired operator enabling performance of signature calculation.

FIG. 5 shows an example of operator dedicated to a signature calculation over a bit sequence, this signature being meant to enable a detection and/or a correction of errors which have occurred in the sequence. This operator is associated with an instruction which will be referred to as "BCH" which uses two parameters, one being a word D containing a group of bits over which the signature is to be calculated, and the second one being the length L of the bit group. The group of bits to be processed is, for example, stored on the right side in word D.

The concatenated codes provided by the variable-length coding are put into frames including a fixed number of bits according to standards H.221, H.261, and H.263. According to standard H.223, the number of bits of the frames is variable. In each frame, a signature referred to as BCH which corresponds to the remainder of the division of the polynomial formed of the bit sequence of the frame by a specific generator polynomial is inserted. This generator polynomial is of degree 4 for standard H.221, of degree 8 or 15 for standard H.223, and of degree 18 for standards H.261 and H.263.

In a wired implementation of the polynomial division, each bit of the sequence to be processed is successively inserted in a shift register. The content of this shift register is renewed, for each inserted bit, by a bit-to-bit exclusive-OR operation between the content of the register and the coefficients of the generator polynomial. When all bits of the sequence have been supplied to the shift register, this register contains the signature BCH searched, which is inserted in a frame upon transmission.

Upon reception, the same operations are performed over all the bits of a frame, including over signature BCH inserted upon transmission. If the signature then found is zero, no error has occurred in the transmission. If the signature is not zero, a transmission error has occurred and this non-zero signature enables correction of a bit in the context of standards H.261 and H.263. For this purpose, successive zeros are inserted in the shift register containing the signature. If after inserting the i-th zero, the first bit of the shift register is at 1 while the other bits are at 0, this means that the i-th bit of the frame is erroneous. In the opposite case, and if the number of zeros inserted in the shift register exceeds the length of the frame, the error is uncorrectable.

The specific function of instruction BCH and of the associated operator is to enable the calculation of a signature BCH by processing a sequence of bits by successive groups of bits instead of processing it bit per bit, the updating of the signature for each successive group being performed in one instruction cycle.

FIG. 5 shows the operator in the specific example of an 8-bit microprocessor in which groups of at most 8 bits $D_0$ to $D_7$ can be processed. The signature BCH being calculated is contained in a register BCH formed of n flip-flops 150 numbered from 0 (the example shown corresponds to standard H.261 or H.263 where n=18). The coefficients of the generator polynomial are contained in a register POLY formed of flip-flops 152, also 18 of number, numbered from 0 to 17. For each possible bit $D_j$ to be processed, a row of 18 two-input exclusive-OR gates 154 is provided. The exclusive-OR gates are symbolized by adders since, in the Galois body on which the polynomial calculations are defined, the exclusive-OR operations are in fact additions.

In the first row, the i-th exclusive-OR gate 154, except for the last gate of the row, receives the i-th bit of the generator polynomial on its first input and the (i+1)-th bit of signature BCH on its second input.

The i-th gate 154 of the j-th row receives, on its first input, the i-th bit of the generator polynomial and, on its second input, the output of the (i+1)-th gate 154 of the preceding row. The last gate 154 of the j-th row receives, on its first input, the last bit of the generator polynomial and, on its second input, bit $D_{j-1}$ of word D supplied as the first parameter by instruction BCH.

Each gate 154 is associated with a multiplexer 156 which will be described hereafter. For the time being, it is assumed that multiplexers 156 are in the position symbolized in the first three rows, interconnecting gates 154 in the way just described.

With this configuration, assuming that register BCH contains the signature calculated over a preceding series of bits, the gates 154 of the j-th row issue the signature calculated over the entire preceding series and bits $D_0$ to $D_{j-1}$ issued by the current instruction BCH. It is then enough to update register BCH with the outputs of the j-th row and to execute once again instruction BCH with a new group of bits to obtain a new signature at the output of the row of gates 154 associated with the number of bits of the new group.

Various methods can be used to select the outputs of the adequate row of exclusive-OR gates in order to update register BCH.

The example illustrated in FIG. 5 is especially well adapted to a generation of the circuit by means of VHDL language. The i-th multiplexer 156 of the j-th row receives the output of the i-th gate 154 of the same row and the output of the i-th multiplexer of the preceding row. The i-th multiplexer of the first row receives, instead of the output of a multiplexer, the i-th bit of signature BCH. The second input of the i-th gate 154 of a row, except for that of the last gate of the row, receives the output of the (i+1)-th multiplexer of the preceding row. The outputs of the multiplexers of the last row issue the new content of register BCH.

The multiplexers of the j-th row are controlled by a common signal $EN_{j-1}$ issued by a decoder 158 which receives from instruction BCH the length L of the group of bits to be processed.

Decoder 158, which is a mask generator, controls the L first rows of multiplexers (as shown for the three first rows) so that they select the outputs of gates 154, while the remaining multiplexers are controlled to select the outputs of preceding multiplexers. In this case, the desired calculation is performed by the L first rows of gates 154, the result being directly transmitted to register BCH by the multiplexers of the remaining rows.

Instruction BCH, associated with its operator, enables calculation of a signature upon transmission as well as upon reception. In practice, the bit sequence over which the signature is calculated is a continuous sequence, for example stored by words at consecutive addresses. Instruction BCH can then be used with the maximum value of L (8 in FIG. 5) for each successive word, which enables processing a sequence in a particularly rapid manner. However, the fact that parameter L is variable is useful since the length of a sequence of bits to be processed is not necessarily a multiple of the width of the words. Thus, at the end of the sequence, a number of bits lower than the width of a word, stored on the right side in the word, will have to be processed.

Besides, instruction BCH is also used to perform the error calculation. In this case, with register BCH still containing the non-zero signature just found, instruction BCH is successively executed with, as parameters, L=1 and D=0, until register BCH contains value 100 . . . 0.

Each of the operators just described in relation with FIGS. 3A to 5 is of course only enabled for the execution of the instruction associated therewith. This is performed conventionally by enabling these operators with the opcode issued by instruction decoder 26.

Preferably, a dedicated microprocessor according to the present invention includes all three operators to ensure a maximum efficiency. However, if the microprocessor only included one or two of these operators, its efficiency would exhibit a substantial improvement with respect to a conventional microprocessor of general use.

The various specific registers of the operators according to the present invention are of same nature as registers conventionally incorporated in an ALU, and are accordingly accessible by conventional instructions for manipulating registers.

Of course, the present invention is susceptible to have various alterations, modifications, and improvements which will readily occur to those skilled in the art. The circuits of the operators have been provided as an example only, and it should be clear that the described functions of these operators can be implemented in various other ways.

Such alterations, modifications, and improvements are intended to be part of this disclosure, and are intended to be within the spirit and the scope of the invention. Accordingly, the foregoing description is by way of example only and is not intended to be limiting. The invention is limited only as defined in the following claims and the equivalents thereto.

What is claimed is:

1. A microprocessor including an operator dedicated to a concatenation of variable-length codes to form a sequence of contiguous codes, the operator being associated with a dedicated instruction using two parameters, a first one of which is a word containing a group of bits and the second one of which indicates a length of the group of bits, the operator responding to the dedicated instruction by isolating, in the first parameter, the group of bits having the length indicated by the second parameter and by inserting the bit group so isolated into an active register, in concatenation with a bit group which has been inserted in the active register by a previous execution of the dedicated instruction.

2. The microprocessor of claim 1, wherein the operator includes a reference register updated upon each execution of the dedicated instruction to indicate a position from which the bit group is to be inserted in the active register.

3. The microprocessor of claim 2, wherein, when the second parameter and the reference register indicate that the available space in the active register is insufficient for receiving the bit group, the operator responds to the dedicated instruction by transferring the content of the active register into an auxiliary register of same size and completing the auxiliary register with the first bits of the group; by inserting the remaining bits of the group at the beginning of the active register; and by updating the reference register to indicate the position immediately following the remaining bits in the active register.

4. The microprocessor of claim 3, wherein the reference register indicates the available space in the active register, and wherein the operator includes a circuit for updating the reference register with the difference between its content and the second parameter if the sign of the difference is positive, and with the sum of the difference and of the size of the active register if the sign is negative.

5. The microprocessor of claim 2 including a circuit that enables updating of the reference register.

6. The microprocessor of claim 5 wherein the circuit that enables updating indicates the available space in the active register.

7. The microprocessor of claim 6 wherein the available space in the active register is indicated upon each concatenation.

8. The microprocessor of claim 7 including a subtractor and multiplexer.

9. The microprocessor of claim 8 wherein the subtractor issues to a first input of the multiplexer the difference between the content of the reference register and length parameter.

10. The microprocessor of claim 9 including an adder.

11. The microprocessor of claim 10 wherein the difference is also coupled to said adder which further receives a fixed value equal to the size of the active register.

12. The microprocessor of claim 11 wherein the output of the adder is coupled to the second input of the multiplexer.

13. The microprocessor of claim 12 wherein the multiplexer selects, to update the content of the reference register, the output of the subtractor if the sign of the difference is positive, and selects the output of the adder if the sign is negative.

14. A microprocessor including an operator dedicated to an extraction of variable-length codes from a sequence of contiguous codes, the operator being associated with a dedicated instruction using a parameter which indicates a length of a group of bits to be extracted, the operator responding to the instruction by extracting from an active register a number of bits indicated by the parameter, starting from an end of a group of bits which has been extracted from the active register by a preceding execution of the dedicated instruction.

15. The microprocessor of claim 14, wherein, the operator includes a reference register updated for each execution of the dedicated instruction to indicate the position from which the group of bits is to be extracted from the active register.

16. The microprocessor of claim 15, wherein when the parameter and the reference register indicate that the last bits to be extracted from the active register are in insufficient number to form the group, the operator responds to the dedicated instruction by extracting the last bits of the active register and the missing bits to complete the group at the end of an auxiliary register of same size as the active register; by transferring the content of the auxiliary register into the active register; and by updating the reference register to indicate the position immediately following the missing bits in the active register.

17. The microprocessor of claim 16, wherein the reference register indicates the number of remaining bits to be extracted from the active register, and the operator includes a circuit for updating the reference register with the difference between its content and the parameter if the sign of the difference is positive, and with the sum of the difference and of the size of the active register if the sign is negative.

18. The microprocessor of claim 15 including a circuit for updating the reference register.

19. The microprocessor of claim 18 including a subtractor that provides the difference between the length provided by the instruction and the content of the reference register.

20. The microprocessor of claim 19 including a subtractor that provides the difference between the length provided by the instruction and the content of the reference register.

21. The microprocessor of claim 20 wherein the difference is provided to a first input of the multiplexer.

22. The microprocessor of claim 21 including a second subtractor.

23. The microprocessor of claim 22 wherein the second subtractor provides as a command to a shift circuit, the difference between the length and the content of the reference register.

24. The microprocessor of claim 23 including a third subtractor.

25. The microprocessor of claim 24 wherein the difference provided by the third subtractor is provided to a second input of the multiplexer which updates the content of the reference register with the difference provided by the first subtractor when the difference is positive, and with the difference provided by the third subtractor otherwise.

26. A microprocessing method including the steps of; providing an operator dedicated to a concatenation of variable-length codes to form a sequence of contiguous codes, the operator being associated with a dedicated instruction using two parameters, a first one of which is a word containing a group of bits and the second one of which indicates a length of the group of bits, the operator responding to the dedicated instruction by; isolating, in the first parameter, the group of bits having the length indicated by the second parameter and by; inserting the bit group so isolated into an active register, in concatenation with a bit group which has been inserted in the active register by a previous execution of the dedicated instruction.

27. The method of claim 26 including updating the reference register upon each execution of the dedicated instruction to indicate the position from which the bit group is to be inserted in the active register.

28. The method of claim 27 wherein, when the second parameter and the reference register indicate that the available space in the active register is insufficient for receiving the bit group, the operator responds to the dedicated instruction by transferring the content of the active register into an auxiliary register of same size and completing the auxiliary register with the first bits of the group; by inserting the remaining bits of the group at the beginning of the active register; and by updating the reference register to indicate the position immediately following the remaining bits in the active register.

29. A microprocessing method comprising the steps of; providing an operator dedicated to an extraction of variable-length codes from a sequence of contiguous codes, the operator being associated with a dedicated instruction using a parameter which indicates the length of a group of bits to be extracted, the operator responding to the instruction by extracting from an active register the number of bits indicated by the parameter, starting from the end of a group of bits which has been extracted from the active register by a preceding execution of the dedicated instruction.

30. The method of claim 29 wherein the operator provides a reference register updated for each execution of the dedicated instruction to indicate the position from which the group of bits is to be extracted from the active register.

31. The method of claim 30 wherein when the parameter and the reference register indicate that the last bits to be extracted from the active register are in insufficient number to form the group, the operator responds to the dedicated instruction by extracting the last bits of the active register and the missing bits to complete the group at the end of an auxiliary register of same size as the active register; by transferring the content of the auxiliary register into the active register; and by updating the reference register to indicate the position immediately following the missing bits in the active register.

* * * * *